C. KILBURN.
STONE TOOL.
APPLICATION FILED JAN. 13, 1913.
1,214,320.
Patented Jan. 30, 1917.
3 SHEETS—SHEET 3.
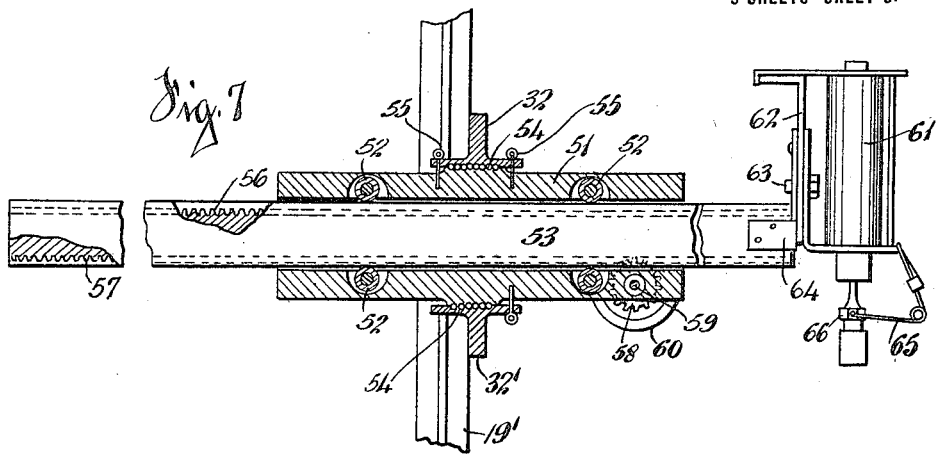
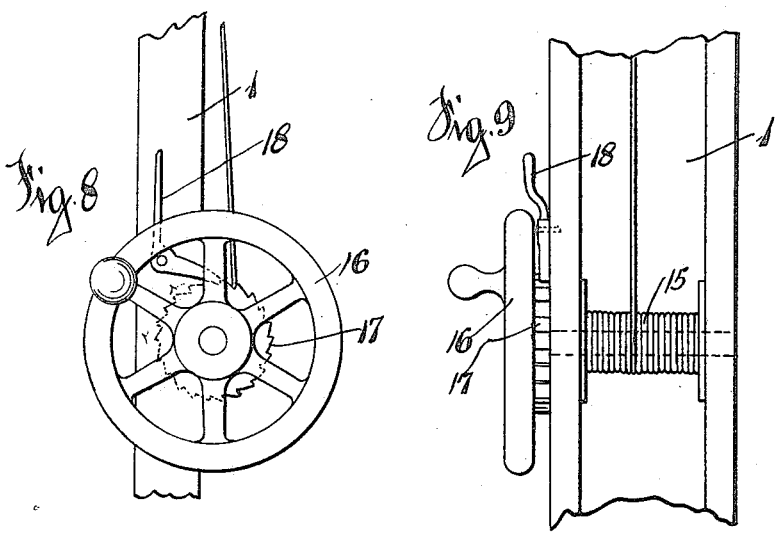
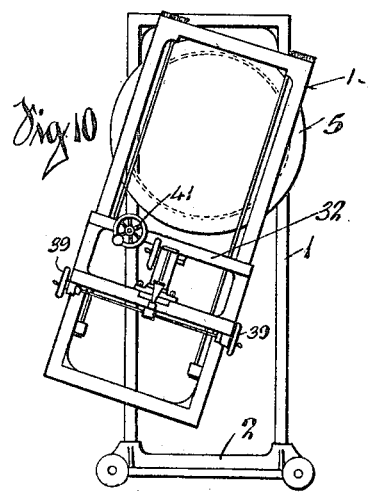
Witnesses
CB Wood
Mae Grothoff
Inventor
Charles Kilburn
by
Oliver J. Harman
Attorney

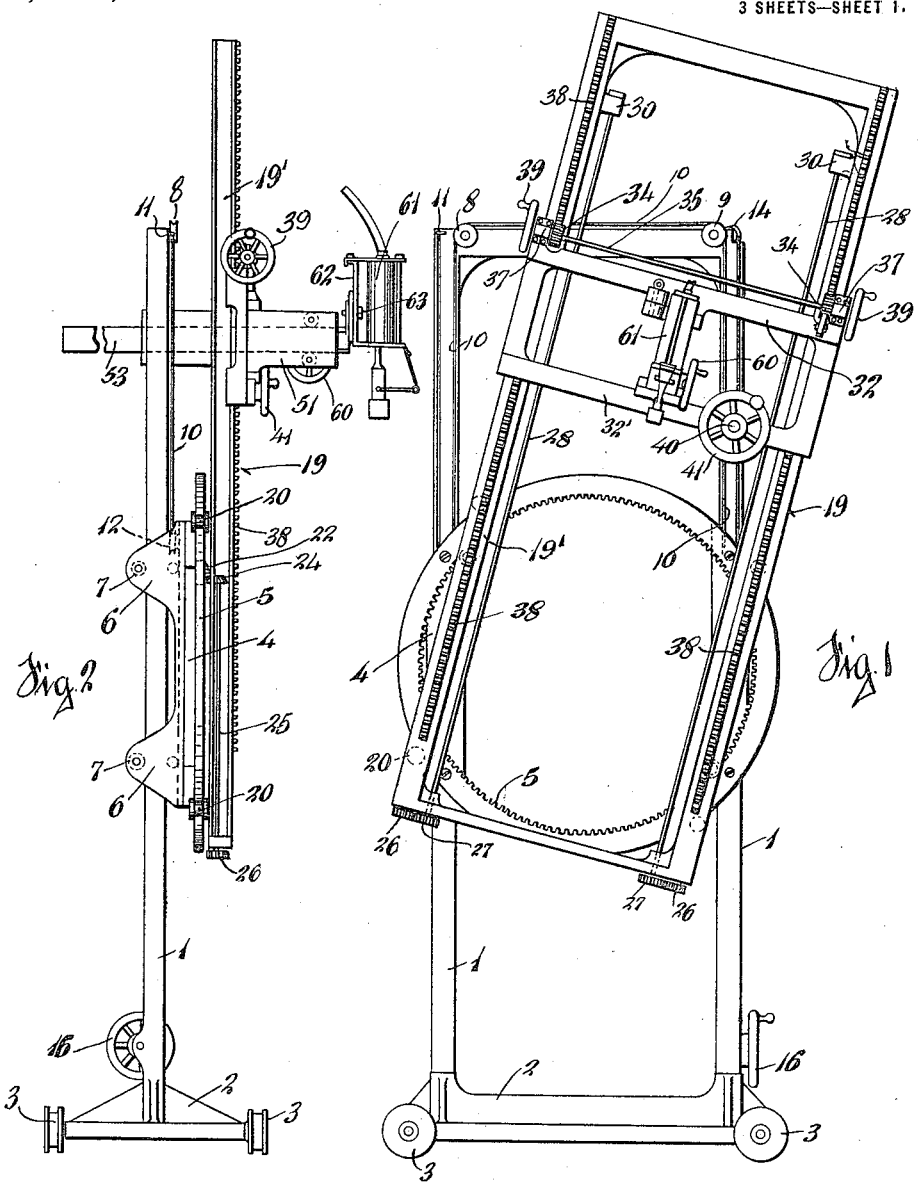

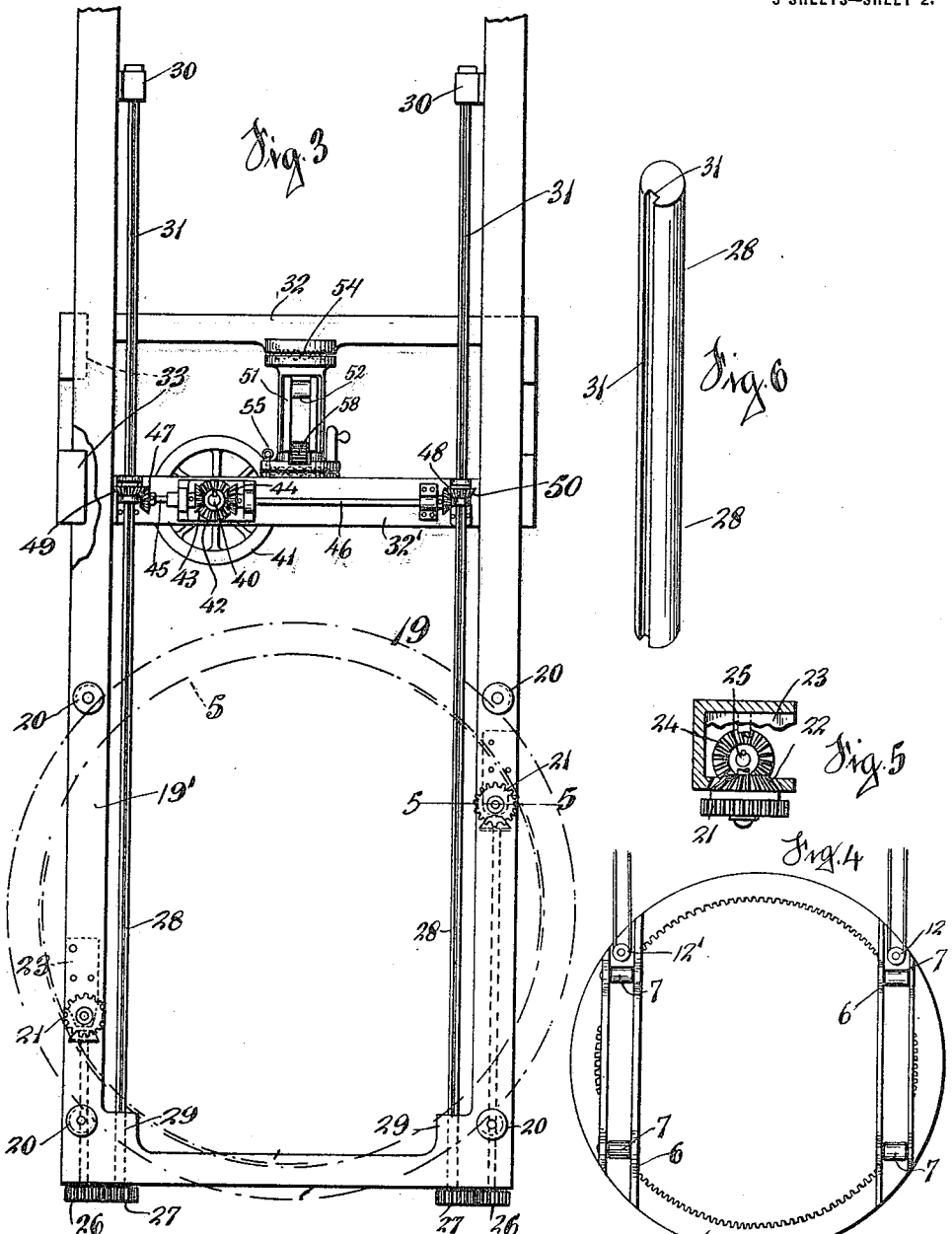

UNITED STATES PATENT OFFICE.

CHARLES KILBURN, OF CINCINNATI, OHIO.

STONE-TOOL.

1,214,320.  Specification of Letters Patent.  Patented Jan. 30, 1917.

Application filed January 13, 1913. Serial No. 741,623.

*To all whom it may concern:*

Be it known that I, CHARLES KILBURN, a citizen of the United States, residing at Cincinnati, in the county of Hamilton and State of Ohio, have invented certain new and useful Improvements in Stone-Tools, of which the following is a specification.

My invention relates to stone tools and more particularly to pneumatic surfacing machines for surfacing stones.

The object of my invention is to provide a surfacing machine which can be used for flat, concave or convex surfaces, and which will operate the cutting tool in an arc when cutting the concave or convex surfaces.

In the art of cutting stones with the machines now in use it is customary to cut the concave or convex surfaces with the cutting tool being adjusted in a horizontal plane, thereby cutting a series of straight surfaces or bevels on the stone, after which it is necessary to trim the ridges which have thereby been produced to properly shape the stone. It is this disadvantage that my machine is intended to overcome, as well as the disadvantage experienced of having to move the stone considerably to position it properly for the cutting of each bevel.

My invention consists of a machine constructed in such a manner as to allow the cutting tool to be adjusted perpendicularly and radially with relation to the main frame of the machine, the radial movement being both in a horizontal and vertical plane.

My invention consists further in certain parts and combinations of parts as will be described in the following specifications and pointed out in the appended claims.

In the drawings: Figure 1 is a front elevation of a machine constructed in accordance with my invention. Fig. 2 is a side elevation of the same. Fig. 3 is an enlarged view of the adjustable frame employed in my invention. Fig. 4 is a view of the circular gear rack employed in my invention. Fig. 5 is a detail sectional view taken on the line 5—5 of Fig. 3. Fig. 6 is a detail perspective view of a portion of one of the operating shafts employed in my invention. Fig. 7 is a sectional view taken through the swivel bearing for the arm which carries the tool showing the tool carrying arm in position. Figs. 8 and 9 are enlarged detail views of the windlass mounted at the bottom of the machine for raising and lowering the adjustable frame; and Fig. 10 is an elevational view showing the adjustable frame adjusted to cut a concave surface.

Referring more particularly to the drawings 1 represents a standard preferably of the rectangular shape, and preferably constructed of channeled steel. The standard is preferably mounted on a truck 2 having suitable wheels 3 which may be adapted to operate on a track or otherwise.

A carriage 4 is provided and is adapted to slide perpendicularly on the standard 1, and consists of the circular gear rack 5 upon which the brackets or sliding bearings 6 are mounted. The sliding bearings 6 are preferably provided with rollers 7 which engage the standard 1 and allow the carriage to operate smoothly thereon.

The standard 1 is also provided with pulleys 8 and 9 over which a cable 10 passes. The cable 10 is fastened at the top of the standard 1 at 11 and passes down around a pulley 12 on the carriage 4 and then around the pulley 8 on the standard as shown in Fig. 1. The cable then crosses at the top of the standard 1 to the pulley 9 on the other side of the standard 1 and then down around another pulley 12' on the respective side of the carriage and then over a pulley 14 at the top of the standard, which pulley is set at an angle to allow the cable after passing over the pulley to extend down the inside of the channel standard 1 to a windlass 15 having an operating handle or wheel 16 thereon. Thus it is seen that the carriage may be raised or lowered by winding or unwinding the cable on the windlass. A ratchet 17 is provided and is adapted to be engaged by a dog 18 which prevents the windlass from unwinding. However the dog may be disengaged to allow the windlass to be unwound to lower the carriage.

A rotating carrier 19 is mounted on the carriage 4 by means of rollers 20 and pinion gears 21 thereon, the gear rack 5 of the carriage passing therebetween as best illustrated in Fig. 3. The rotating carrier consists of the rectangular frame 19' preferably constructed of channeled steel as shown in Figs. 3 and 5. The pinion gears 21 are adapted to be operated in order to cause them to travel on the circular gear rack 5 of the carriage in order to rotate the carrier 19 thereon. These pinion gears 21 have a bevel pinion 22 on their rear side as best shown in Fig. 5 and are mounted in a block 23 in the channel steel carrier frame 19. These bevel pinion gears mesh with pinion gears 24 tightly mounted on a vertically disposed shaft 25 which is suitably journaled in the channel steel carrier frame 19. At the lower ends of the shafts 25 I provide gears 26 tightly mounted thereon which mesh with gears 27 mounted on shafts 28 running parallel with the sides of the carrier frame 19 and journaled therein at 29 and 30. The shaft 28 is provided with a splineway 31 as best shown in Fig. 6.

A tool beam bracket 32 is mounted on the rotating carrier 19 by means of the flanges 33 gripping the edges of the channeled frame 19', and is adapted to slide thereon. Pinion gears 34 tightly mounted on a shaft 35 journaled in journals 37 on the tool beam bracket 32 are provided and are adapted to engage the gear racks 38 on the rotating carrier channel frame 19' as best shown in Figs. 1 and 2. The shaft 35 is provided with the operating wheels or handles 39 so as to provide means for raising and lowering the tool beam bracket.

As seen in the drawings the tool beam bracket 32 is rectangular in shape and is provided with a lower connecting portion 32', in which the shaft 40 is journaled. The shaft 40 carries a hand wheel 41 at its outer end and a beveled pinion gear 42 at its inner end (Fig. 3). The beveled pinion gear 42 meshes with two bevel pinion gears 43 and 44 mounted on the inner ends of shafts 45 and 46, respectively. These shafts are suitably journaled on the cross portion 32' and have bevel gears 47 and 48 at their outer ends. The bevel gears 47 and 48 mesh with the bevel gears 49 and 50, respectively, which are mounted on the shafts 28, which are provided with the splineways 31. The bevel gears 49 and 50 are provided with the keys or feathers to engage the splineway 31 in the shafts 28, thereby allowing the bevel gears 49 and 50 to slide thereon, but causing them to rotate the shafts 28 therewith. Thus when the hand wheel 41 is operated the pinion gear 42 is operated, thereby operating the bevel gears 43, 44, 47 and 48, which in turn operate the bevel gears 49 and 50 on the shafts 28, thereby operating the shafts 28 which operate the gears 26 by means of the gears 27 mounted at the ends thereof. When the gears 26 are operated the shafts 25 are rotated thereby rotating the bevel gears 24, which in turn operate the pinion gears 21, thereby causing the carrier frame 19 to rotate on the circular gear rack 5 of the carriage 4.

The tool beam bracket is provided with a swivel beam holder 51 provided with rollers 52 suitably journaled therein, upon which the tool beam 53 is adapted to ride. The swivel beam holder is preferably journaled in the tool beam bracket 32 and provided with ball bearings 54. The swivel beam holder 51 may be provided with any desired type of bearing so as to cause the tool beam holder to properly rotate on the tool beam bracket. When it is desired to use the machine on flat surfaces, the pins 55 are withdrawn from their sockets and the tool beam holder is then free to rotate on the bearings 54. In order to hold the tool beam rigidly in the tool beam bracket, I provide pins 55 which pass through suitable openings provided in the tool beam bracket and swivel beam holder 51. The beam is thereby held rigid against rotating or swinging in a horizontal plane when the machine is being used on concave or convex surfaces.

The tool beam is provided with gear racks 56 and 57 at the top and bottom thereof respectively. These gear racks are adapted to be engaged by a pinion gear 58 (Fig. 7) mounted on a shaft 59 upon which is mounted a hand wheel 60. Thus the tool beam is moved longitudinally in the swivel beam holder 51 to adjust the pneumatic hammer machine 61 to any point desired to the side of the device.

The pneumatic hammer 61 is of the ordinary construction, but is mounted in a bracket 62 which is adapted to be inverted in its position on the tool beam. The bracket is secured to the tool beam by means of the screw or bolt 63 which can be loosened to allow the pneumatic hammer to be inverted on the tool beam. This is necessary when it is desired to cut a concave surface because of the fact that it is necessary then to raise the carriage 4 up near the top of the standard 1 and then rotate the rotatable carrier 19, thus bringing the tool beam below the center of rotation. The tool beam is then inverted in its position and the pneumatic tool is rotated on the bracket 62 at the end of the tool beam. The tool beam is preferably provided with the bracket 64 at the end thereof to form convenient means of fastening the bracket 62 thereto.

It is customary for the workman who uses the ordinary surfacing machines to hold the tool into engagement with the pneumatic hammer with his hand. With my machine this would be difficult when a concave or convex surface was being cut, inasmuch as the workman has to operate two hand wheels, one for the adjustment of the lengthwise movement of the tool beam, and the other the rotating movement of the rotating carrier. Therefore I provide a spring 65 on the bottom of the bracket 62, which is bent to reach the cutting tool, and has a suitable clamp 66 for holding the cutting tool into engagement with the pneumatic hammer.

Many modifications of my invention may be made without departing from its spirit and scope and I do not wish to be confined to the exact details shown.

What I claim as new and desire to secure by Letters Patent is:—

1. A device of the character described comprising a standard open at the center thereof, a carriage open at the center thereof, adapted to be adjusted perpendicularly on said standard, a circular gear rack forming part of said carriage and open at the center whereby a column to be surfaced may be passed through the entire device, and means on said carriage for supporting a hammer tool, means on the carriage for adjusting the hammer whereby the tool is operated around the surface of the column inserted through the device.

2. In a stone surfacing machine, the combination with a standard; of a carriage comprising bearings allowing for its movement in a plane parallel with the length of said standard and a circular gear rack open at the center thereof after being properly mounted on said standard, a rotating carrier open at the center after being mounted on said carriage, and being provided with pinion gears for coöperation with the said circular gear rack of said carriage, a tool beam bracket slidable along the entire length of said rotating carrier, a swivel beam holder on said tool beam bracket being adapted to swing in a plane transverse the length of said rotatable carrier and a tool beam slidable in said swivel beam holder in the line of its own length.

3. A device of the character described comprising a standard, a truck, a carriage adapted to be adjusted perpendicularly on said standard, said carriage comprising a circular gear rack mounted on slidable bearings, said slidable bearings adapted to engage the standard, a rotating carrier, pinion gears on said rotating carrier adapted to mesh with said circular gear rack, rollers on said rotating carrier adapted to engage the circular gear rack, a tool beam bracket slidably mounted on said rotatable carrier, a horizontal tool beam rotatably mounted in said bracket and means for rotating said rotating carrier on said circular gear rack.

4. In a stone surfacing machine the combination with a standard, of a carriage, means for adjusting said carriage in a line parallel to the length of said standard, a carrier rotatable in a plane parallel to the length of said standard, independent means for rotating said carrier on said carriage, a tool beam bracket adjustable longitudinally on said carrier, independent means for accomplishing said adjustment, a tool beam holder pivotally mounted on said tool beam bracket and adapted to swing in a plane transverse of the length of said carrier, a tool beam slidable in the line of its own length in said tool beam holder, means for holding said tool beam holder rigid against rotation in said tool beam bracket and means for slidably operating said tool beam in said tool beam holder.

CHARLES KILBURN.

Witnesses:
C. B. WOOD,
OLIVER W. SHARMAN.

Copies of this patent may be obtained for five cents each, by addressing the "Commissioner of Patents, Washington, D. C."